(12) United States Patent
Wang et al.

(10) Patent No.: US 9,663,680 B2
(45) Date of Patent: May 30, 2017

(54) AQUEOUS DISPERSIBLE POLYMER COMPOSITION

(75) Inventors: Shaofeng Wang, Singapore (SG); Jingqiu Li, Singapore (SG); Xiaoqun Ye, Singapore (SG); Sundararajan Govindarajan, Singapore (SG); Zeling Dou, Singapore (SG); Swee How Seow, Singapore (SG)

(73) Assignee: NIPSEA TECHNOLOGIES PTE LTD, Singapore (SG)

( * ) Notice: Subject to any disclaimer, the term of this patent is extended or adjusted under 35 U.S.C. 154(b) by 0 days.

(21) Appl. No.: 14/110,677

(22) PCT Filed: Jul. 18, 2012

(86) PCT No.: PCT/SG2012/000256
§ 371 (c)(1),
(2), (4) Date: Oct. 8, 2013

(87) PCT Pub. No.: WO2013/012394
PCT Pub. Date: Jan. 24, 2013

(65) Prior Publication Data
US 2014/0212675 A1    Jul. 31, 2014

(30) Foreign Application Priority Data

Jul. 18, 2011 (GB) .................................. 1112324.7

(51) Int. Cl.
C08G 18/42 (2006.01)
C09D 201/00 (2006.01)
(Continued)

(52) U.S. Cl.
CPC ........... *C09D 175/04* (2013.01); *C08G 18/10* (2013.01); *C08G 18/6705* (2013.01);
(Continued)

(58) Field of Classification Search
USPC ........................................................ 524/500
See application file for complete search history.

(56) References Cited

U.S. PATENT DOCUMENTS

| 5,418,301 A | 5/1995 | Hult et al. |
| 2004/0030031 A1 | 2/2004 | Martin et al. |

(Continued)

FOREIGN PATENT DOCUMENTS

| CN | 102030884 | 4/2011 |

OTHER PUBLICATIONS

Derwent Abstract Accession No. 2011-M36105, Univ South China Technology, Apr. 27, 2011.
(Continued)

*Primary Examiner* — Ling Choi
*Assistant Examiner* — Thuy-Ai N Nguyen
(74) *Attorney, Agent, or Firm* — Hovey Williams LLP

(57) ABSTRACT

The present disclosure relates to an aqueous dispersible polymer composition comprising: (a) at least one of: (i) a dendritic polymer in admixture with a hydrophilic functionalizing agent; and (ii) a hydrophilic functionalized dendrimer; and (b) a non-dendritic polymer capable of forming bonds with said dendritic polymer to thereby form a dendrimer-non-dendrimer (DND) polymer hybrid that is dispersible in the aqueous phase, methods of forming the same and uses thereof.

19 Claims, 1 Drawing Sheet

(51) Int. Cl.

| | |
|---|---|
| *C08L 101/00* | (2006.01) |
| *C09D 175/04* | (2006.01) |
| *C09D 167/00* | (2006.01) |
| *C08G 18/67* | (2006.01) |
| *C08G 18/70* | (2006.01) |
| *C08G 18/73* | (2006.01) |
| *C08G 18/75* | (2006.01) |
| *C08G 18/10* | (2006.01) |
| *C09D 175/14* | (2006.01) |
| *C09D 5/02* | (2006.01) |
| *C08G 83/00* | (2006.01) |

(52) U.S. Cl.
CPC ........... *C08G 18/706* (2013.01); *C08G 18/73* (2013.01); *C08G 18/758* (2013.01); *C08G 83/006* (2013.01); *C08L 101/005* (2013.01); *C09D 5/02* (2013.01); *C09D 167/00* (2013.01); *C09D 175/14* (2013.01); *C09D 201/005* (2013.01); *Y10T 428/31551* (2015.04)

(56) References Cited

U.S. PATENT DOCUMENTS

| | | | | |
|---|---|---|---|---|
| 2004/0063828 | A1* | 4/2004 | Loen | .................. B01F 17/0014 524/186 |
| 2004/0072923 | A1* | 4/2004 | Matsunami | ............ C09D 11/30 523/160 |
| 2008/0289539 | A1* | 11/2008 | Tazzia | .................. C08G 83/002 106/287.25 |
| 2009/0081373 | A1* | 3/2009 | Choate | .................... B05D 7/53 427/385.5 |

OTHER PUBLICATIONS

Wang, L. et al., "Synthesis of hyperbranched polyurethane aqueous dispersions and their film performances", Xiandai Tuliao Yu Tuzhuang, 2007, vol. 10, n4, pp. 14-16.

Namazi, H. et al., "Novel linear-globular thermoreversible hydrogel ABA type copolymers from dendritic citric acid as the A blocks and polyethylene glycol as the B block", European Polymer Journal, 2003, vol. 39, pp. 1491-1500.

International Search Report for PCT/SG2012/000256 dated Sep. 7, 2012 (3 pages).

European Search Report for EP Application No. 12814606.5 dated Dec. 15, 2014 (4 pages).

Office Action received in connection with Japanese Patent Application No. 2014-521598 dated May 30, 2016 (11 pages).

Office Action received in connection with Korean Patent Application No. 10-2013-7027515 dated Aug. 8, 2016 (14 pages).

Office Action received in connection with Russian Patent Application No. 2013147026 dated Jul. 7, 2016 (6 pages).

* cited by examiner

AQUEOUS DISPERSIBLE POLYMER COMPOSITION

RELATED APPLICATION

The present application is a national stage application under 35 U.S.C. §371 of International Application No. PCT/SG2012/000256, filed Jul. 18, 2012, which is incorporated by reference herein in its entirety.

TECHNICAL FIELD

The present invention relates to an aqueous dispersible polymer composition, methods of making the same and uses thereof.

BACKGROUND

Dendritic polymers (or "dendrimers") are polymers with hyperbranched structures which can comprise a high number of reactive functional groups exposed at the peripheral edges of the hyperbranched dendrimer molecule. Depending on the degree of branching, dendritic polymers may be classified into first, second, third, fourth or even fifth generation dendritic polymers. A first generation dendritic polymer may theoretically have a total of eight peripheral reactive functional groups, whereas a second generation polymer will have theoretically sixteen peripheral functional groups, and whereas a third generation polymer will have theoretically thirty two peripheral functional groups and so forth. The total number of peripheral functional groups per molecule is also referred to as the peripheral functionality.

Dendritic polymers have been used in the field of manufacturing protective coatings due to its unique structure which leads to the formation of high performance coatings. For example, the molecules of dendritic polymers mimic the hydrodynamic volumes of spheres, and as such, they can be used to provide coatings of high molecular weights whilst maintaining relatively low viscosity. At the same time, dendritic polymers provide coatings with high crosslink density at the same time keep its flexibility.

Conventionally, protective coatings comprising dendritic polymers are provided as solvent-based coating systems due to the dendritic polymer's lack of solubility in water. Such solvent-based systems provide excellent abrasion resistance, flexibility, adhesion, and chemical resistance. However, due to the presence of organic solvents which are volatile in nature, coatings prepared from solvent-based systems will typically emit an undesirably high level of volatile organic compounds ("VOC"). In recent years, ever stricter regulatory requirements in many countries have driven coating manufacturers to explore the possibilities of non solvent-based coating systems.

Accordingly, water-based coating systems have been proposed to overcome the problem of VOC emission. However, conventional water-based coating systems have poorer properties in terms of hardness and chemical resistance than solvent borne coating systems. In one study, dendritic polymers whose peripheral reactive groups have been functionalized with ionic functional groups (also termed "ionomers") were proposed. In this study, the proposed ionomers were dispersed in water and comprised an approximately 40% solid content. However, such water-based coating systems suffer from some technical drawbacks. For instance, when these ionomers are mixed with cross-linkers in one-component ("1K") or two-component ("2K") preparations to form water-based coatings, there is a tendency for the formed coating to experience phase separation which may be due to the reactions between cross-linkers and the water solvent.

To address this problem, it has been suggested to add excess surfactant to these water-based coating systems in a bid to prevent phase separation. While the addition of excess surfactant does ameliorate the problem of phase separation, it results in an overall softened coating when applied to a surface. This can be highly undesirable for applications such as protective coatings where the surface hardness of the coating is one of the key properties required for the coating to fulfill its protective function.

In addition to the above, water-based coatings comprising the above mentioned ionomers also suffer from poor homogeneity. As a result', the applied coatings typically have uneven surfaces and exhibit undesirable blistering, resulting in the coated article having a poor aesthetical appearance. Additionally, the reaction rate between cross-linkers and the ionomers have been observed to be less than satisfactory. In particular, it has been postulated that due to the high specific surface area of the dendritic polymer, the peripheral reactive groups are situated very closely to each other. Such proximity can cause a significant amount of steric hindrance, which in turn impedes the reaction rate between the ionomer and cross-linkers.

Therefore, there is a need to provide a water-dispersible coating that overcomes, or at least ameliorates, the technical problems above. In particular, there is a need to provide a water-dispersible coating that does not experience phase separation, displays a high level of homogeneity, has excellent film forming properties, readily reacts with cross-linkers and is capable of being rapidly cured after being applied onto a surface. There is also a need to provide a method for producing such a water-dispersible coating.

SUMMARY

Accordingly, in a first aspect, there is provided an aqueous dispersible polymer composition comprising:
(a) at least one of: (i) a dendritic polymer in admixture with a hydrophilic functionalizing agent; and (ii) a hydrophilic functionalized dendrimer; and
(b) a non-dendritic polymer capable of forming bonds with said dendritic polymer to thereby form a dendrimer-non-dendrimer (DND) polymer hybrid that is dispersible in the aqueous phase and said non-dendritic polymer being selected to enable said DND polymer hybrid to exhibit superior film forming properties in said aqueous phase relative to a functionalized dendritic polymer.

In one embodiment, the aqueous dispersible polymer composition comprises a dendritic polymer in admixture with the hydrophilic functionalizing agent, the functionalizing agent being substantially prevented from reacting with the dendritic polymer.

In another embodiment, the aqueous dispersible polymer composition comprises a dendrimer that has already been functionalized with the hydrophilic functionalizing agent, wherein the peripheral functional groups of the dendrimer are at least partially substituted by the hydrophilic groups of the functionalizing agent.

Advantageously, the non-dendritic polymer can be selected such that the DND polymer hybrid is capable of forming an aqueous dispersible polymer composition that exhibits superior film forming properties when compared to conventional water-dispersible compositions comprising only a functionalized dendritic polymer. In particular, it has been found that an aqueous dispersible polymer composition comprising the disclosed DND polymer hybrids unexpectedly increases the homogeneity of the aqueous dispersible polymer composition, especially when used in 2K coating systems, thereby improving its film forming properties.

Advantageously, a coating prepared with the aqueous dispersible polymer composition, when applied to a surface, does not exhibit an uneven surface or result in formation of blisters.

Also advantageously, it has been surprisingly found that an aqueous dispersible polymer composition comprising a DND polymer hybrid does not experience phase separation of the aqueous dispersible polymer composition when in admixture with an aqueous solvent such as water, thus further improving its film forming properties.

Further advantageously, it has been found that a coating prepared with the above disclosed aqueous dispersible polymer composition displays a variety of improved physical/chemical performance, including, improved hardness and scratch resistance, improved water resistance, improved solvent resistance and improved chemical resistance. Concurrently, the coating advantageously retains the flexibility and adhesive properties of conventional water-dispersible coatings.

Further advantageously, a DND polymer hybrid displays a relatively higher average molecular weight or bigger molecular structure compared to dendritic polymer itself. Additionally, the relatively larger molecule of the DND polymer hybrid has better compatibility with cross-linking agents, such as polyisocyanate, and provides more surface area for interaction with other additive compounds. Advantageously, one or more additives may be added to the water-dispersible coating to improve various physical/chemical properties of the coating. Such additives include, but are not limited to, surfactants, ultra-violet (UV) absorbers, and nanoparticles.

Furthermore, the large DND polymer hybrid molecule may also have a greater molecular interstitial volume which may be useful for accommodating additives compounds within the bulk polymer phase and cause them to be evenly distributed throughout the DND polymer. This is useful for imparting desired physical/chemical properties to the aqueous dispersible polymer composition while at the same time ensuring that the homogeneity of the composition is maintained.

In a second aspect, there is provided a process for preparing an aqueous dispersible polymer composition, said process comprising the steps of: (a) providing at least one of: (i) a dendritic polymer; and (ii) a hydrophilic functionalized dendrimer; and either one of steps: (b1) mixing said (i) dendritic polymer with a non-dendritic polymer in the presence of a cross-linker, followed by reaction with a hydrophilic functionalizing agent; or (b2) mixing said (ii) hydrophilic functionalized dendrimer with a non-dendritic polymer, to thereby form a dendrimer-non-dendrimer (DND) polymer hybrid that is dispersible in an aqueous medium, said non-dendritic polymer being selected to enable said DND polymer hybrid to exhibit superior film forming properties in said aqueous medium relative to a functionalized dendritic polymer.

In a third aspect, there is provided the use of the aqueous dispersible polymer composition as defined above or an aqueous dispersible polymer composition produced according to the process defined above, for forming a protective coating over a surface.

In a fourth aspect, there is provided an article coated by the coating as defined in the third aspect.

DEFINITIONS

The following words and terms used herein shall have the meaning indicated:

In the context of the present specification, the term "aqueous dispersible polymer composition" is to be used interchangeably with the terms "water-based polymer composition" and/or "water-borne polymer composition" and is taken to refer to a polymer composition that is either substantially or completely miscible or dispersible in an aqueous medium such as water.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Disclosure of Optional Embodiments

Exemplary, non-limiting embodiments of the above disclosed aqueous dispersible polymer composition in accordance with the first aspect will now be disclosed.

The non-dendritic polymer according to the first aspect may be selected from the group consisting of aliphatic polyester, cyclic polyester, polyurethane, cyclic aliphatic polyester, polyacrylate, polyester polyol, polyurethane polyol, polyacrylate polyol, polycarbonate, polycarbonate polyol, copolymers and blends thereof.

In one embodiment, the non-dendritic polymer is selected to enable the DND polymer hybrid to exhibit improved film forming properties in an aqueous phase relative to a polymer composition comprising a dendritic polymer functionalized with ionic/hydrophilic groups. Advantageously, an aqueous-dispersible polymer composition comprising the DND polymer hybrid exhibits improved homogeneity and does not experience phase separation. Also advantageously, the disclosed aqueous-dispersible polymer composition does not require addition of excess surfactants to allow for film forming, hence avoiding the adverse effects surfactants exert on surface hardness. Further advantageously, the disclosed aqueous-dispersible polymer composition does not form an uneven surface or blister when applied onto as a surface coating, leading to improved aestheticism.

In one embodiment, the non-dendritic polymer is an aqueous dispersible polyurethane, such as an aliphatic polyurethane dispersion (PUD). In another embodiment, the non-dendritic polymer is an aliphatic polyester diol. In yet another embodiment, the non-dendritic polymer may be a co-polymer comprising polyacrylate and a polyester polyol. In a preferred embodiment, the non-dendritic polymer is PUD, which is selected for its good flexibility and the combination with a dendritic polymer provides the PUD with complementary properties such as water and chemical resistance.

In one embodiment, the hydrophilic functionalizing agent may include a compound that is capable of functionalizing the dendritic polymer with hydrophilic groups. The hydrophilic groups may be selected from the group consisting of primary amino groups, secondary amino groups, tertiary amino groups, quaternary ammonium salt groups, an amide group, an aldehyde group, a carbonyl group, a carboxyl group, a carboxylate group, an ester group, a sulfonic acid group, phosphoric acid group and a hydroxyl group. In one embodiment, the hydrophilic functionalizing agent may be any compound which reacts to functionalize the dendritic polymer with the aforementioned hydrophilic functional groups. A preferred functional group includes carboxyl functional groups and hence, in one embodiment the hydrophilic functionalizing agent may include mono-carboxylic acids, di-carboxylic acids, and anhydrides of aromatic, aliphatic and cycloaliphatic, mono-carboxylic and di-carboxylic acids.

In a preferred embodiment, the functionalizing agent is selected from anhydrides of di-carboxylic acids such as maleic anhydride and succinic anhydride.

The dendritic polymer may be a hydroxyl-terminated polyester. The dendritic polymer may have from about 20 to about 80 peripheral hydroxyl groups. In one embodiment, the dendritic polymer may be a second generation dendritic polymer having a theoretical number of 16 peripheral hydroxyl groups per polymer molecule (also termed as "peripheral functionality"). Preferably, the dendritic polymer may be a third or fourth generation dendritic polymer having theoretical peripheral functionality of about 32 to 64. It is generally preferred to have the peripheral functionality range between 32 to 64 in order to provide sufficient peripheral functional groups for reaction with cross linkers and substitution with hydrophilic groups, and at the same time, allow for the ease of forming a film. Dendritic polymers having peripheral functionality that is too high may result in the formation of an overly viscous composition, which may experience difficulty in film formation. Nonetheless, higher generation dendritic polymers having a peripheral functionality of greater than 64, such as 128, are also envisioned within the scope of the present invention.

In one embodiment, the non-dendritic polymer may be present in an amount of at least 20% by weight based on the total weight of the DND polymer hybrid. In another embodiment, the non-dendritic polymer may be in an amount from 20% to 95% by weight based on the total weight of the DND polymer hybrid. In yet another embodiment, the non-dendritic polymer may be present in an amount of about 25%, about 30%, about 35%, about 40%, about 45%, about 50%, about 55%, about 60%, about 65%, about 70%, about 75%, about 80%, about 85%, about 90% or about 95% by weight, based on the total weight of the DND polymer hybrid. In one embodiment, the non-dendritic polymer may be present in the DND polymer hybrid in an amount of from about 50% to about 95% by weight based on the total weight of said polymer hybrid. In another embodiment, the non-dendritic polymer may be present in an amount from about 70% to about 90% by weight based on the total weight of the DND polymer hybrid.

The DND polymer hybrid may be at least partially functionalized by the functionalizing agent. In one embodiment, the peripheral hydroxyl groups of the DND hybrid polymer may be at least partially substituted with the hydrophilic groups imparted from the hydrophilic functionalizing agent.

Based on the total number of peripheral hydroxyl groups, the degree of substitution of these peripheral hydroxyl groups with the hydrophilic groups of the functionalizing agent may be selected from the group of about 5%, about 10%, about 15%, about 20%, about 25%, about 30%, about 35%, about 40%, about 45%, and about 50%. In one embodiment, at least 5% of the peripheral hydroxyl groups are substituted with the hydrophilic groups of the functionalizing agent. In another embodiment, about 20% of the peripheral hydroxyl groups may be substituted with the hydrophilic groups of the functionalizing agent. In a preferred embodiment, the hydrophilic groups are carboxylic groups, which may be present in a dissociated form ($-COO^-$, $H^+$) or a non-dissociated form ($-COOH$).

The disclosed aqueous dispersible polymer composition may comprise one or more cross linkers. Any cross-linker compound comprising a functional moiety capable of reacting with the peripheral hydroxyl groups and/or the hydrophilic groups to form covalent bonds, may be used as a cross-linker in the disclosed composition. In one embodiment, the functional moiety may be an aliphatic or aromatic isocyanate comprising the cross-linkable moiety ($-N{=}C{=}O$). In one embodiment, the cross-linker may have a general formula $R-N{=}C{=}O$, wherein R may be selected from substituted or non-substituted, aliphatic or aromatic alkyls, alkenyls, aryls and the like.

In another embodiment, the cross-linker may be a diisocyanate having a general formula $O{=}C{=}N-R_1-R_2-N{=}C{=}O$, wherein $R_1$ and $R_2$, being same or different, may be independently selected from substituted or non-substituted, aliphatic or aromatic, alkyls, alkenyls, aryls and the like.

In one embodiment, the cross-linker is selected from the group consisting of: diphenylmethane 4,4'-diisocyanate, methylenebis-4,4'-isocyanatocyclohexane, 1,6-hexamethylene diisocyanate (HDI), 1,4-cyclohexane diisocyanate, p-phenylene diisocyanate, triphenylmethane-4,4',4",-triisocyanate, methylene diphenyl diisocyanate (MDI), toluene diisocyanate (TDI), tetramethylxylene diisocyanate, isophorone diisocyanate (IPDI) and mixtures thereof. It is preferred that the cross-linkers are high order isocyanates compounds, having at least two, and preferably at least three or four isocyanate moieties for each cross-linker molecule.

The cross-linker may also be a blocked compound wherein its cross-linkable moiety is chemically reacted with a blocking agent to substantially prevent it from reacting with the dendritic polymer. In one embodiment, the cross-linker can be a blocked isocyanate selected from the list disclosed above. The blocked isocyanate may be used in 1K systems wherein the cross-linker is provided in admixture with the aqueous dispersible polymer composition and does not require a separate mixing step prior to applying the composition as a coating onto a surface. In one embodiment, the blocked isocyanate may be freed for reaction via the application of heat. Blocked isocyanates are not used in 2K systems where the dendritic polymer composition and the cross-linkers are only mixed shortly before applying the composition as a coating onto a surface.

The cross-linker may also be selected from melamine formaldehyde resins. In one embodiment, the melamine formaldehyde resin is a hexamethoxymethyl-melamine formaldehyde resin.

The aqueous dispersible polymer composition may further comprise nanoparticles dispersed through the bulk of the DND hybrid polymer. While not limited to these uses, nanoparticles may be added to the aqueous dispersible polymer composition to impart physical strength, improve wear resistance and durability, increase solids content, improve the ease of cleaning the coating, improve physical appearance, and provide ultra violent (UV) degradation. In one embodiment, the nanoparticles may be metal oxide nanoparticles. Preferably, the nanoparticles are selected from oxides of aluminum and zinc. Typically, when added into the composition, the average particle size of the nanoparticles ranges from about 1 nm to 500 nm. In another embodiment, these nanoparticles may be encapsulated within a polymer which has been suitably functionalized for reaction with the cross-linkers.

The aqueous dispersible polymer composition may further comprise one or more of the following: UV-absorbers, surfactants, catalysts for cross-linking, and stabilizers.

In one embodiment, the catalyst may be a dibutyltin compound such as dibutyltin dilaurate and dibutyltin diacetate. In another embodiment, the catalyst may be a strong acid, preferably a sulfonic acid. Exemplary acid catalysts may include dodecylbenzyl sulfonic acid, p-toluenesulfonic acid. Preferably, acid catalysts are used when the cross-linkers used belong to the class of melamine formaldehyde resins. Preferably, dibutyltin compounds are used as catalysts when the cross-linkers used belong to the class of isocyanates.

The aqueous dispersible polymer composition may further comprise one or more types of acrylic functional monomers. The acrylic functional monomers may be integrally linked with the DND polymer hybrid via reaction with the cross-linkers, to thereby attach acrylic functional groups on the DND polymer hybrid. Advantageously, the presence of the terminal double bonds provided by the acrylic functional group may aid formation of radicals upon exposure to UV radiation. This may allow for UV curing when the coating formed from the disclosed composition is subjected to UV radiation. The acrylic functional monomers may be added to the aqueous dispersible polymer composition in an amount sufficient to cause about 10% to about 50% substitution of the functional groups on the dendritic polymer with acrylic functional groups. In one embodiment, the acrylic functional monomer is added in an amount sufficient to cause about 20%, about 30%, or about 40% substitution of the functional groups on the dendrimer with acrylic functional groups.

Exemplary acrylic functional monomers may be selected from, but are not limited to, the group consisting of 2-hydroxyethylacrylate (HEA), hydroxyl ethyl methacrylate (HEMA) and glycidyl methacrylate (GMA) and monomer blends thereof.

Exemplary, non-limiting embodiments of the process for preparing an aqueous dispersible polymer composition in accordance with the second aspect will now be disclosed.

The disclosed process may further comprise a step of mixing the DND polymer hybrid obtained from step (b) of the process, with one or more cross-linkers to form the aqueous dispersible polymer composition. In a typical 2K system, the cross linkers may be mixed with the DND polymer hybrid just shortly before applying the composition to a surface as a coating. On the other hand, for a 1K system, the cross-linkers may be provided in the form of functionally capped or blocked cross-linkers. In this case, the capped or blocked cross-linkers may simply be mixed with the DND polymer hybrid to form a 1K system.

The mixing step (b1) according to the disclosed process may comprise physical blending, for example, using a mechanical blender. The physical blending may be undertaken at room temperature (i.e., cold blending) using a mechanical mixer. In one embodiment, the dendritic polymer may be functionalized with the hydrophilic functional groups prior to being physically blended with the non-dendritic polymer. In another embodiment, the non-dendritic polymer may be blended with a dendritic polymer that has not been functionalized. In the latter case, the subsequently formed DND polymer hybrid may be thereafter subjected to a reaction with the hydrophilic functionalizing agent to attach the hydrophilic functional groups to the DND polymer hybrid.

The mixing step (b2) may also comprise chemically reacting the dendritic polymer in admixture with the hydrophilic functionalizing agent or the hydrophilic functionalized dendritic polymer with the non-dendritic polymer in the presence of a cross linker such as a cycloaliphatic diisocyanate, until the amount of isocyanate groups available for reaction is substantially depleted. This is then followed by reaction with the hydrophilic functionalizing agent.

In one embodiment, the hydrophilic functionalizing agent is selected to impart hydrophilic groups on said dendritic polymer. The hydrophilic groups may be selected from the group consisting of primary amino groups, secondary amino groups, tertiary amino groups, quaternary ammonium salt groups, an amide group, an aldehyde group, a carbonyl group, a carboxyl group, a carboxylate group, an ester group, a sulfonic acid group, phosphoric acid group and a hydroxyl group.

In one embodiment, the hydrophilic functionalizing agent may be selected to be any compound which reacts to functionalize the dendritic polymer with the aforementioned hydrophilic functional groups. A preferred functional group includes carboxyl functional groups and hence, in one embodiment, the hydrophilic functionalizing agent may include mono-carboxylic acids, di-carboxylic acids, and anhydrides of aromatic, aliphatic and cycloaliphatic, mono-carboxylic and di-carboxylic acids. In a preferred embodiment, the functionalizing agent is selected from anhydrides of di-carboxylic acids such as maleic anhydride and succinic anhydride In step (a)(ii) of the disclosed process, the hydrophilic functionalized dendrimer may be a dendritic polymer that has been functionalized by the hydrophilic functionalizing agent disclosed above.

The disclosed process may further comprise a step of neutralizing the functionalized DND polymer hybrid with a base. Where the DND polymer hybrid has been functionalized with carboxyl groups, the neutralization can be undertaken with any suitable base capable of neutralizing the carboxylic group. Exemplary bases may include compounds such as, but not limited to, triethylamine (TEA) dimethylethanolamine, N-methyldiethanolamine, N-ethyldiethanolamine, triisopropanolamine, triethanolamine and dimethylisopropanolamine. The neutralization step may be undertaken until the pH of the system containing the DND polymer hybrid and base is about 8 to about 9. Advantageously, after neutralization, the carboxyl functional groups on the DND polymer hybrid may be dissociated to form $COO^-$ and $H^+$ ions respectively. The ionic form of the functional group enhances the miscibility and dispersibility of the polymer composition in an aqueous medium. Further advantageously, it has been found that the shelf life of the aqueous dispersible polymer composition may be longer in a slightly basic environment. After neutralizing with amine, the $COO^-$ and $H^+$ ions form a double layer of electron structures, which is metastable at a pH of about 8 to 9, thereby maintaining a stable system. However, when the pH becomes too acidic or too basic, the metastable system will be reorganized, and the double layer electron structure will break down, causing a reduction in stability and hence shelf life.

In the disclosed use according to the third aspect, the disclosed aqueous dispersible polymer composition may be used in either a 1K or 2K system in order to form a water-dispersible coating for application over a surface. After applying the polymer composition to the surface, a curing step may be undertaken at temperatures ranging from about 20° C. to about 100° C. for 2K coating systems, whereas the curing step may be undertaken at about 60° C. to about 160° C. for 1K baking coating systems. In another embodiment, where acrylic functional monomers have been added to the aqueous dispersible polymer composition, the applied coating may be cured via exposure to UV radiation. The use of temperature curing in combination with UV curing is also envisioned within the scope of the present invention.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

EXAMPLES

Figure 1A:
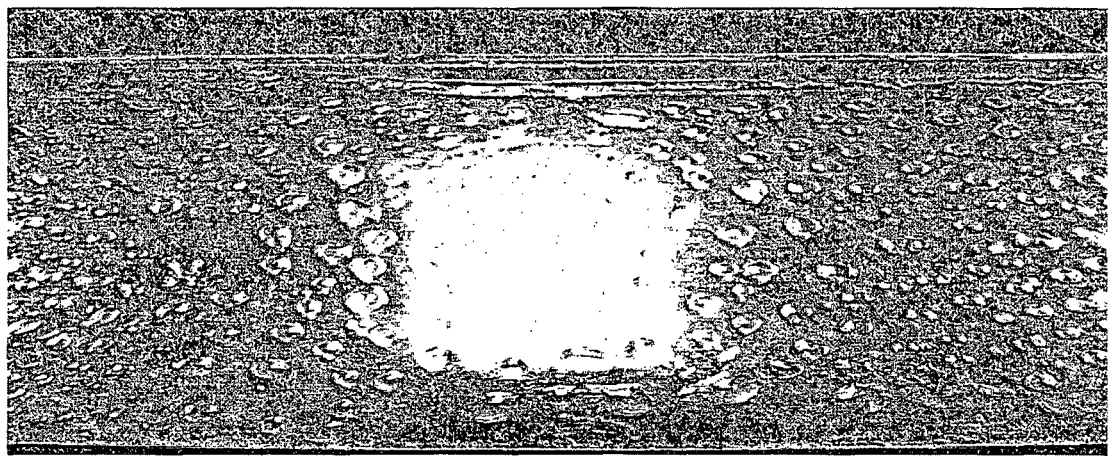
FIG. 1A is a photograph showing the surface appearance of a water-dispersible coating that has been applied onto a tin panel. The water dispersible coating is formed from a functionalized dendritic polymer mixed with cross-linkers.

Non-limiting examples of the invention will be further described in greater detail by reference to specific Examples, which should not be construed as in any way limiting the scope of the invention.

Materials Used

Below is a list of the raw materials used in the following Examples. The commercial names (in bold) of the following raw chemicals will be used in the Examples for convenience.
1. Aliphatic polyester diol comprising hydroxyl end groups, with molecular weight 1100 g/mol, hydroxyl (OH) number 110+5 mg KOH/g liquid, ("RSP 2163"), procured from PCTS Specialty Chemicals Pte Ltd, Singapore.
2. Polycarbonate diol with hydroxyl end groups, molecular weight 1000 g/mol, OH number 110+10 mg KOH/g wax solid, ("Eternacoll® UH-100") procured from UBE Chemical Europe.
3. Polyether diol with hydroxyl end groups, molecular weight 1000 g/mol, OH number 106-118 mg KOH/g liquid, ("PPG 1000") procured from Sigma Aldrich, United States of America.
4. Aqueous hydroxyl-functional polyacrylic dispersion, viscosity of 400-1500 mPa·s, OH equivalent weight around 1145 ("Bayhydrol A 145") procured from Bayer MaterialScience AG.
5. Cycloaliphatic diisocyanate, having a viscosity of approximately 35 mPa·s, NCO content 31.8-32% ("Vestanat H12MDI") procured from Evonik Industries, Germany.
6. Dendritic polymer, with theoretically 64 peripheral hydroxyl groups, having a molecular weight of about 5100 g/mol solid, OH value 470-500, ("Boltorn H40") procured from Perstorp Singapore Pte Ltd.
7. Dendritic polyester polyol, with OH equivalent weight of about 200-300 and solid content of about 70%, ("PE-164-70s") procured from Nanovere Technologies, United States of America.
8. Pure aliphatic polyurethane dispersion ("PUD 163P") procured from Nipsea Technologies, Singapore, having solids content: 33.8%; Viscosity: 35.5 cps; pH: 7.87; Mw=39673, and Mn=9747.
9. Water-dispersible, hexamethylene diisocyanate (HDI), with NCO equivalent weight of about 182 ("Bayhydur XP 2547") procured from Bayer MaterialScience AG.
10. A low viscosity, solvent-free, polyfunctional aliphatic polyisocyanate resin based on hexamethylene diisocyanate (HDI), with NCO equivalent weight of 183, ("Desmodur N3600") procured from Bayer MaterialScience AG.
11. A hexamethoxymethyl-melamine-formaldehyde resin, with 98% solid ("Resimene 747") procured from Ineos Melamines, Germany.
12. A hexamethoxymethyl/n-butyl-melamine formaldehyde resin, with 98% solids ("Resimene CE7103") procured from Ineos Melamines, Germany.

Testing Methods

In the following Examples, the following industrially recognized testing methods are used to characterize the water-dispersible coatings:
Adhesion (1 mm×1 mm): ASTM D3359;
Impact (as measured in Inch (in)/pounds (lb) (direct)): ASTM D2794;
Pencil Hardness (Break/Scratch): ASTM D3363;
Flexibility (⅛"): ASTM D522;
Stain resistance of household chemicals (50% Ethanol solution, water, 5% NaOH): ASTM D1308;
Tensile Strength (Elongation): ASTM D412;
In addition, the following protocol will be adopted for the methyl ethyl ketone ("MEK") rub test:
(i) Prepare film on a glass panel with 100 μm wet film thickness ("WFT");
(ii) Dry the panel at a predetermined temperature for a predetermined duration (temperature and curing time depend on specific coatings) prior to testing;
(iii) Saturate a cotton bud with MEK and hold it at 45° angle to the test surface, rub the test surface with moderate pressure. A complete rub consisting of one forwards rub and one backwards rub motion is considered one double rub. The surface is rubbed continuously until the substrate glass panel is exposed. Record the total number of double rubs.

Comparative Example 1

Preparation of a Carboxy-Terminated Dendritic Polymer

Boltorn H40 and about 50% wt N-Methyl-2-pyrrolidone (NMP) based on Boltorn H40 is mixed in a 100 ml round bottom flask with reflux. Stirring is undertaken at 90° C. for an hour until the mixture turns homogeneous. To the stirred mixture, maleic anhydride is quantitatively added until 5% (Example 1D), 10% (Example 1C), 30% (Example 1B) and 50% (Example 1A) of the hydroxyl functional groups of the Boltorn H40 have been substituted respectively. The temperature is then raised to 100° C. and stirring is continued for another 60 minutes. After that, the mixture is cooled to 65°

C., followed by the addition of 22.2 g of triethylamine ("TEA") and 180.4 ml of deionised (DI) water. Mixture is stirred for another 15 minutes. The product is cooled to room temperature and filtered with a 25 μm filter cloth.

For illustration purposes only, the reaction between the anhydride and the Boltorn dendritic polymer may be represented by a general reaction scheme I shown below, wherein at least m number of —OH groups have been substituted by the carboxyl groups (—COOH) via reaction with anhydride:

Scheme I:

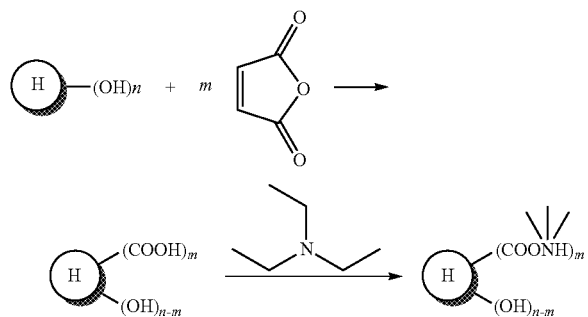

Four samples of functionalized dendritic polymer having varying degrees of OH substitution were prepared in accordance with the protocol described in Comparative Example 1 as Comparative Examples 1A-1D respectively. The physical properties of each of the Comparative Examples 1A-1D are tabulated in Table 1 below.

TABLE 1

|  | Comparative Example 1A H40-50% | Comparative Example 1B H40-30% | Comparative Example 1C H40-10% | Comparative Example 1D H40-5% |
|---|---|---|---|---|
| COOH Percentage | 50% | 30% | 10% | 5% |
| Neutralization | 100% | 100% | 100% | 100% |
| Dispersion Appearance | Clear dark yellow solution. | Clear dark yellow solution. | Hazy brownish solution. | Milky light brownish solution |
| OH Equivalent Weight (g/mol) | 800 | 489 | 304 | 279 |
| Solid Content % | 53.83% | 55.39% | 52.46% | 52.56% |
| Viscosity (cps) | 126 | 158 | 75.5 | 86 |
| PH | 7.24 | 8.34 | 7.78 | 6.86 |

Comparative Example 2

Preparation of Coating Composition Based on Carboxyl-Functionalized Dendritic Polymer Comparative Example 2 describes the preparation of a coating composition using the carboxyl-functionalized dendritic polymer of Example 1C using a two-component (2K) system. The two components are termed "Side A" and "Side B" and their respective compositions are shown below in Table 2.

TABLE 2

| Name | | Equivalent weight (EW) | Amount (g) | Weight (%) |
|---|---|---|---|---|
| Side A | H40-10% (Example 1C) | 303.95 | 10 | 29.1 |
|  | Water |  | 6 | 17.5 |
|  | Coalescing Agent (Coasol ™) |  | 6 | 17.5 |
|  | Surfactant (BYK 346 ™) |  | 0.05 | 0.15 |
|  | Catalyst (dibutyltin acetate) |  | 0.05 | 0.15 |
| Side B | Bayhydur XP 2547 | 186 | 12.24 | 35.6 |
|  | total |  | 34.34 | 100 |

Figure 1B:
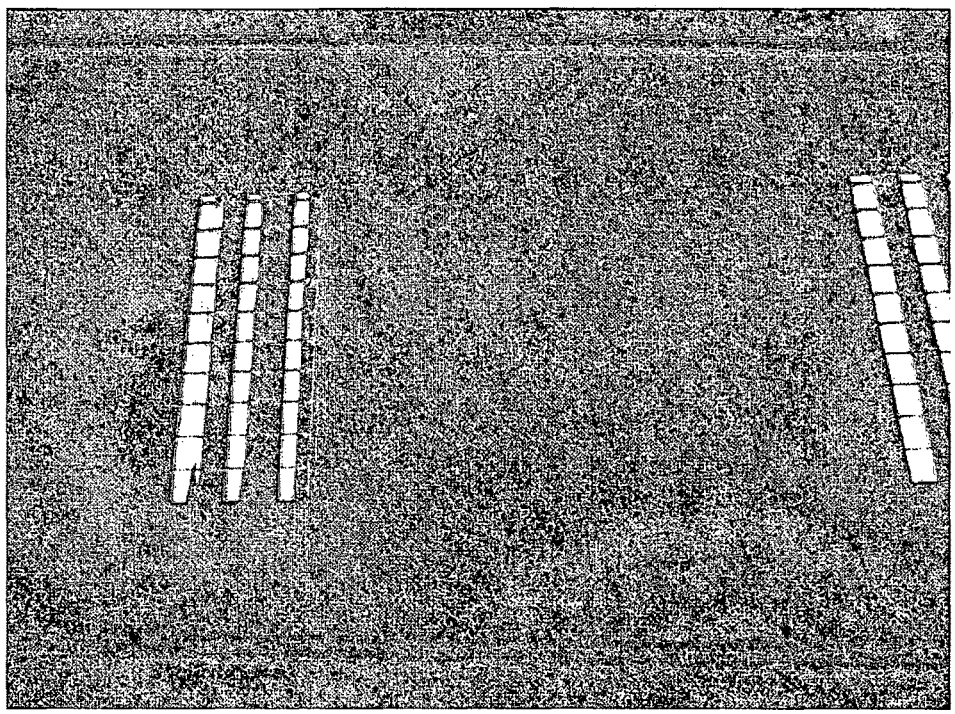
FIG. 1B is a photograph showing the surface appearance of a water-dispersible coating that has been applied onto a tin panel. The water dispersible coating is formed of a water-dispersible composition in accordance with the present invention.

Side A and Side B are then mixed together to form a water dispersible coating composition. The inventors found that the mixture of Sides A and B (above) resulted in the formation of a very bubbly mixture, which is unsuitable for film formation. The bubbling mixture is further indicative that a significant level of phase separation has occurred. This also suggests that the extent of reaction between the carboxyl-functionalized dendritic polymer and the polyisocyanate cross-linker is low and that an appreciable amount of side-reactions may have occurred between the cross-linkers and the water medium. FIG. 1 shows the appearance of a coating formed by applying the composition of Example 2 to a tin panel surface. As can be observed from FIG. 1A, the surface of the coating is very uneven and experiences severe blistering.

Example 3

Preparation of DND Polymer Hybrid Using Dendritic Polymer and Polyurethane Dispersion (PUD) by Cold Blending 186.3 g of Boltorn H40 and 93.1 g of NMP are mixed in a 1 L reactor. The mixture is heated up to 90° C. until all the Boltorn H40 are melted and a homogenous solution is obtained. 17.9 g of maleic anhydride is added and the temperature is adjusted to 100° C. and maintained for another 60 minutes. Thereafter, the mixture is cooled to 65° C., and followed by the addition of 22.2 g of TEA and 180.4 g of de-ionized water. The mixture is then stirred for another 15 minutes. The resulting product is cooled to room temperature (approx. 25° C.) and filtered with a 25 μm filter cloth. The filtered product is a milky light reddish solution with the solid content of 52.46% and with a viscosity of 75.5 cps, a pH value of 7.78.

10 g of the filtered product is taken and further blended with 16.56 g of substantially pure PUD 163P at room temperature to give a light milky solution with a solids content of 40%, Ew=803 mg KOH/g and pH=7.35.

Example 4

Preparation of a Coating Composition Based on the Carboxyl-Functionalized DND Polymer Hybrid Obtained from Example 3

Example 4 describes the preparation of a coating composition using the functionalized DND polymer hybrid of Example 3 using a two-component (2K) system. The two components are termed "Side A" and "Side B" and their respective compositions are shown below in Table 3. The ratio of peripheral —OH groups (DND polymer hybrid) to the —N═C═O groups (cross-linkers) is about 1:2.

TABLE 3

| | Wt % |
|---|---|
| Side A | |
| DND polymer hybrid (from Example 3) | 48.52 |
| Coalescing agent (Coasol ™) | 15.77 |
| Surfactant (BYK 346 ™) | 0.73 |
| 10% catalyst dibutyltin dilaurate (DBTDL) in Coasol ™ | 0.29 |
| Water | 12.13 |
| Side B | |
| Bayhydur XP2547 ™ | 22.56 |
| Total | 100 |

Side A is blended with Side B to form the aqueous dispersible polymer composition. Compared to the bubbling mixture obtained in Comparative Example 2, the mixture of the DND polymer hybrid with the cross-linker component (polyisocyanate) results in a completely homogenous solution and no phase separation is observed. Importantly, the resultant mixture can be used to form a film after application onto a panel surface and after curing at 85° C. Compared to the coating of Comparative Example 2, the coating prepared from the DND polymer hybrid displays superior coating performance. In particular, the coating of Example 4 shows higher pencil scratch hardness (increases from HB to 2H); improved water and chemical resistance (MEK rub can increase from less than 10 to 471). The coating performance of Example 4 and a coating prepared from commercial water-borne PUD are tabulated in Table 4 below for comparison.

TABLE 4

| Film Performance | Coating prepared based on Example 4 | PUD 163P |
|---|---|---|
| 100μ Wet Film Thickness (WFT) on tin panel | | |
| Pencil Hardness, scratch/break | 3H/3H | HB/4H |
| Impact, In. lb | >80 | >80 |
| Flexibility, 1/8" | pass | pass |
| 100μ WFT on Glass | | |
| Pencil Hardness, scratch/break | 2H/3H | HB/4H |
| MEK Double Rub, cycles | 471 | <10 |
| Spot test | | |
| Water resistance (24 hrs) | No change | blistering |
| 5% NaOH Solution resistance | Whitening | Whitening and cracking |
| 50% Ethanol resistance | 2 hours: No change | 1 hour: blistering |

From Table 4, it can be seen that a coating prepared from a commercially available water-borne polymer composition, such as PUD, displays comparable hardness and flexibility with the coating of Example 4. However, the disparity in performance becomes clear when both coatings are subject to standard chemical and water resistance tests. For instance, the PUD-based coating could only withstand less than 10 cycles of the MEK double rub whereas the coating of Example 4 is capable of resisting 471 cycles of the MEK double rub. The coating prepared from Example 4 also displayed superior resistance to water, ethanol and alkaline.

Example 5

Preparation of a DND Polymer Hybrid Using Various Non-Dendritic Polymers Via Chemical Bonding In this Example, the inventors test the use of three different types of copolymers (Examples 5A, 5B and 5C respectively) in a DND polymer hybrid. All three Examples are later used in 1K coating systems.

Example 5A is a DND polymer hybrid comprising PE164-70s (dendrimer) and a commercial polyester RSP2163.

Example 5B is a DND polymer hybrid comprising PE164-70s (dendrimer) and a polycarbonate (UH100)

Example 5C is a DND polymer hybrid comprising PE16470s (dendrimer) and a commercial polyether diol PPG100 polyester RSP2163.

Example 5A 131.3 g of commercial polyester RSP2163 and 142.4 g of H12MDI are mixed in a 1 L reactor with $N_2$ plug. The mixture is heated to 90° C. and reacted for 30 minutes. To the heated mixture, there is added 10.1 g of PE164-70s, 22.03 g of dimethylol propionic acid (DMPA) and 97.78 g of NMP. The mixture is kept at 90° C. for further reaction until the —N=C=O % is constant and close to a theoretical value of 4.2% upon complete reaction (this value can be determined by titration). The mixture is then cooled to 45° C. with the addition of 19.6 g TEA, followed by 518.0 g of deionized water to disperse the mixture under high agitation speed of 500 rpm for another 15 minutes. The resultant product is cooled to room temperature and filtered with a 25 μm filter cloth.

The final product is a translucent solution with the solid content of 34.37% and with a viscosity of 37 cps, a pH value of 8.01 and an average particle size of 35 nm.

Example 5B 237.8 g of UH100 and 300.1 g of H12MDI are added to a 2 L reactor with $N_2$ plug. The mixture is heated up to 90° C. and reacted for 30 minutes, followed by the addition of 42.1 g of DMPA, 20.2 g of PE164-70s and 196.97 g of NMP. The reaction is carried out at 90° C. until the —N=C=O % is constant and close to the theoretical value of 5.4%.

The mixture is cooled to 45° C. with the addition of 38.0 g of TEA, followed by 1056.0 g of deionized water to disperse at high agitation speed of 500 rpm for another 15 minutes. The product is cooled to room temperature and filtered with a 25 μm filter cloth. The final product is a translucent solution with the solid content of 32.76% and with a viscosity of 18 cps, a pH value of 7.46 and an average particle size of 37 nm.

Example 5C 183.1 g of PPG 1000 and 291.3 g of H12MDI were mixed in a 2 L reactor and heated up to 90° C. for reaction. After 30 min, 45.0 g of DMPA, 60.0 g of PE164-70s and 200.2 g of NMP were added into the reaction. The reaction continued at 90° C. until the NCO % is constant and close to the theoretical value. (NCO %=4.2%) The mixture is cooled down to 45° C. with the addition of 40.0 g TEA, followed by 1060.2 g of deionized water to disperse the mixture under high agitation speed of 500 rpm for another 15 minutes. The resultant product is cooled down to room temperature and filtered with a 25 μm filter cloth.

The final product is a translucent solution with the solid content of 29.71% and with a viscosity of 180 cps, a pH value of 8.56 and an average particle size of 91 nm.

Coatings are prepared using 1K systems based on Examples 5A, 5B and 5C. For comparison, respective control coatings 5A', 5B' and 5C' for each of Examples 5A-5C are also prepared. In particular, each of the control coatings 5A'-5C' are prepared without the dendrimer PE164-70s in a 1K system.

It has been found that by incorporating the dendritic polymer with another resin such as polyester, polycarbonate or polyether, the performance of the coating film greatly improves as compared to a coating film that has been prepared without a dendritic polymer component.

With respect to Example 5A, the film tensile strength increases by 66.5%, whereas in Example 5C, the incorporation of the dendritic polymer doubled the film tensile strength, while still high elongation ratio. All the above Examples show that with dendritic polymer incorporated, the pencil hardness at least increases 1 grade. Notably, the pencil hardness (scratch) of the 1K polyether PUD coating increased by 5 grades, from 5B to HB after incorporation with the dendritic polymer. The performance of Examples 5A-5C and the control Examples 5A'-5C' are tabulated in Table 5 below.

Example 6

Preparation of DND Polymer Hybrid Comprising Dendritic Polymer and Commercial Water-Dispersible Polyol Blend 0.3 g of the H40-5% from Comparative Example 1D and 5.7 g of Bayhydrol A 145 are mixed in a mechanical mixer under agitation speed of 500 rpm. Subsequently, 0.5 g of water was added in to yield a milky solution with solid content of 43.7%, an —OH EW of about 1062.

Example 7

Preparation of Coatings Based on the DND Polymer Hybrid of Example 6 and Coatings Based on Commercial Polyacrylic Dispersion Two coatings are prepared in this Example. Specifically, a first coating (Example 7A) is prepared via a 2K system using a commercially available water-borne polyacrylic dispersion. Also using a 2K system, a second coating (Example 7B) is prepared using the DND polymer hybrid according to Example 6. The various compositions of Examples 7A and 7B are tabulated in Tables 6.1 and 6.2 as shown below.

TABLE 5

| Raw Materials | 1K Polyester PUD | | 1K Polycarbonate PUD | | 1K Polyether PUD | |
|---|---|---|---|---|---|---|
| | RSP2163 | RSP2163/PE164-70s | UH100 | UH100/PE164-70s | PPG | PPG/PE164-70s |
| Particle size (nm) | 29 | 35 | 37 | 37 | 37 | 91 |
| Non-volatile content | 33.80% | 34.37% | 33.56% | 32.76% | 31.28% | 29.73% |
| Viscosity (s) | 20 | 21 | 17 | 18 | 20 | 51 |
| Viscosity (cps) (S2, 60 rmp) | 35.5 | 37 | 17 | 18 | 18 | 180 |
| Gravity (g/cm3) | 1.049 | 1.048 | 1.047 | 1.047 | 1.047 | 1.039 |
| PH | 7.87 | 8.01 | 7.63 | 7.46 | 8.07 | 8.56 |
| Tensile Strength (Mpa) | 26.91 | 44.80 | 49.43 | 50.56 | 20.45 | 42.45 |
| Elongation (%) | 327 | 272 | 336 | 248 | 376 | 265 |
| 60° Gloss Level | 89.2 | 89.2 | 89.50 | 89.70 | 87.90 | 84.2 |
| In-Can Appearance | Translucent, flowable liquid, light amine smell | Nearly clear solution, much more translucent than control | Nearly clear solution, much more translucent than control | Nearly clear solution, much more translucent than control | Nearly clear solution, much more translucent than control | High viscosity solution, nearly clear |
| Tin Panel Test: Oven 55° C. 14 hours | | | | | | |
| Pencil hardness (Scratch) | HB | H | 2B | H | 5B | HB |
| Pencil hardness (Break) | 4H | 6H | 4H | 4H | 4H | 6H |
| Flexibility | passed | passed | passed | passed | passed | passed |
| Adhesion | 0% peel off | 0% peel off | 0% peel off | 0% peel off | 0% peel off | 0% peel off |

TABLE 6.1

|  | WT % |
|---|---|
| Side A | |
| Bayhydrol A145 ™ | 59.6 |
| Water | 6 |
| PnB | 17.9 |
| Surfynol DF 110C ™ | 0.3 |
| BYK 345 ™ | 0.6 |
| 10% DBTDL in PnB | 0.3 |
| Side B | |
| Desmodur N 3600 ™ | 15.3 |
| Total | 100.00 |

TABLE 6.2

|  | WT % |
|---|---|
| Side A | |
| DND polymer hybrid of Example 6 | 65.6 |
| PnB | 15.2 |
| Surfynol DF 110C ™ | 0.3 |
| BYK 345 ™ | 0.5 |
| 10% DBTDL in PnB | 0.3 |
| Side B | |
| Desmodur N 3600 ™ | 18.0 |
| Total | 100.00 |

The performance of the coatings of Examples 7A and 7B are compared and tabulated in Table 7 below. As can be seen from the comparative results, Example 7B clearly shows improved pencil hardness (scratch) and superior chemical resistance with only 5% dendritic polymer in DND polymer. For example, the MEK rub cycles increased from 36 to 95 when a DND polymer hybrid is used. The film formed from example 7B is glossy and clear (FIG. 1B) when compared to a film formed from Example 2 (FIG. 1A).

TABLE 7

|  | Example 7A | Example 7B |
|---|---|---|
| Pencil Hardness (Scratch) | HB | H |
| Pencil Hardness (Break) | 3H | 3H |
| Adhesion | 0% peel off | 0% peel off |
| Impact | >80 | >80 |
| Flexibility | passed | Passed |
| Gloss (60° on glass panel) | 154 | 154 |
| MEK Rub | 36 | 95 |
| 50% Ethanol (1 hr) | Blistering, can be easily peeled off | Less blistering than Example 7A, but with moderate whitening on the ring edge. |
| Water (24 hrs) | Blistering, recovered after 1 hour | Less blistering, recovered after 1 hour |
| 5% NaOH (24 hrs) | Whitening on the ring edge, can be easily peeled off | Whitening on the ring edge |

Comparative Example 8

Preparation of Coating Based on Water Dispersible Dendritic Polymer and Surfactant Comparative Example 8 shows the preparation of an aqueous dispersible coating comprising the functionalized dendritic polymer of Example 1D. To overcome the problem of poor film forming ability, an excess amount of surfactant is added in order to form the coating film. The composition of comparative example 8 is provided in Table 8 below.

TABLE 8

|  | WT % |
|---|---|
| Side A | |
| Dendritic polymer of Example 1D | 35.6 |
| Water | 9.6 |
| Coasol ™ | 9.6 |
| Ecosurf ™ BD-405 (surfactant) | 5 |
| Rhodasurf ™ LA-9 (surfactant) | 5 |
| 10% DBTDL in coasol ™ | 2.8 |
| Side B | |
| Bayhydur XP 2547 ™ | 32.4 |
| Total | 100.00 |

Next, the coating of Comparative Example 8 is then subjected to the series of standard tests described in the other Examples above. Table 9 below provides the test results of this coating.

TABLE 9

|  | Comparative Example 8 |
|---|---|
| Drying condition | 85° C. for 2 hours |
| Film Appearance | Homogenous film, lack of gloss and is hazy looking. |
| Pencil Hardness (Scratch/Break) | 2B/2H |
| Adhesion | 0% peel off |
| Impact | >80 |
| Flexibility | Passed |
| MEK Rub | >200 |
| 50%, Ethanol (1 hr) | No changes after 3 hr. |
| 5% NaOH (24 hr) | Film whitening and wrinkle, can be easily peel off. |
| Water (24 hr) | Low level of blistering, recovered after 30 min. |

The above test results show that the use of excess surfactant may help to mitigate the problem of phase separation in 2K coating systems. However, the coating film does not possess a desired glossy appearance and is relatively hazy. Furthermore, even with high dendritic polymer content, the pencil hardness drops to 2B due to the high dosage of surfactant present in the polymer composition which softens the coating. The alkaline resistance is similarly poor. However, the ethanol and water resistance appear to be comparable to coatings prepared from the DND polymer hybrids.

Applications

The disclosed aqueous dispersible polymer composition addresses a number of technical problems known in the art. Firstly, the provision of the disclosed aqueous dispersible coating negates the need for potentially toxic and difficult to dispose organic solvents required by conventional dendritic polymer coatings. The disclosed aqueous dispersible polymer compositions also can be used to prepare coatings having zero or near-zero VOC emission and therefore are well-placed to meet stringent environmental regulations for coating applications.

In addition, the disclosed aqueous dispersible polymer compositions can be formed into films with ease, even without the addition of excess surfactant, thus maintaining their hardness. It has further been demonstrated that the disclosed aqueous dispersible polymer composition affords superior hardness, chemical resistance, alkaline resistance, water resistance and solvent resistance to the formed coatings.

Furthermore, due to their substantially homogeneous nature, the disclosed aqueous dispersible polymer compositions can be easily made into aesthetically-pleasing, glossy films having a substantially smooth, even surface which does not exhibit blistering.

Accordingly, the disclosed aqueous polymer compositions may be used to prepare coatings for numerous applications, including but not limited to, protective coatings for automotives, protective coatings for paints, furniture, aircraft parts, household appliances, and electronic devices.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. An aqueous dispersible polymer composition comprising:
   (a) at least one of:
      (i) a hydroxyl terminated dendritic polymer having a theoretical peripheral functionality of 16 or at least 32 to 64, in admixture with a hydrophilic functionalizing agent which is capable of functionalizing said dendritic polymer to provide a functionalized dendritic polymer wherein at least 5% of its peripheral hydroxyl groups have been functionalized by hydrophilic groups; and
      (ii) a hydroxyl dendritic polymer having theoretical peripheral functionality of 16 or at least 32 to 64 wherein at least 5% of its peripheral hydroxyl groups have been functionalized by said hydrophilic groups; wherein said hydrophilic functional group is selected from the group consisting of: primary amino groups, secondary amino groups, tertiary amino groups, quaternary ammonium salt groups, carboxyl groups, sulfonic acid groups, and phosphoric acid groups;
   (b) a non-dendritic polymer capable of forming bonds with said dendritic polymer to thereby form a dendrimer-non-dendrimer (DND) polymer hybrid that is dispersible in the aqueous phase, and said non-dendritic polymer being selected from the group consisting of: polyester, polyacrylate, polyurethane, polyurethane dispersion (PUD), polyester polyol, polyurethane polyol, polyacrylate polyol, polycarbonate, polycarbonate polyol, copolymers and blends thereof, wherein said non-dendritic polymer is present in an amount of from 20% to 95% by weight based on total weight of said DND polymer hybrid; and
   (c) an aqueous solvent for dispersing said DND polymer hybrid therein.

2. The aqueous dispersible polymer composition of claim 1, wherein the peripheral hydroxyl groups of said dendritic polymer are at least partially substituted by said hydrophilic groups from said functionalizing agent.

3. The aqueous dispersible polymer composition of claim 1, wherein at least 50% of said peripheral hydroxyl groups present on the dendritic polymer are substituted with hydrophilic groups.

4. The aqueous dispersible polymer composition of claim 3, wherein said hydrophilic group is a carboxyl (—COOH) group.

5. The aqueous dispersible polymer composition of claim 4, wherein said composition further comprises one or more cross-linkers.

6. The aqueous dispersible polymer composition of claim 5, further comprising nanoparticles dispersed through the bulk of said DND polymer hybrid.

7. The aqueous dispersible polymer composition of claim 6, wherein said nanoparticles are metal oxide nanoparticles.

8. A process for preparing an aqueous dispersible polymer composition of claim 1, said process comprising the steps of:
   (a) providing at least one of:
      (i) a hydroxyl terminated dendritic polymer; having 16 or at least 32 to 64 theoretical peripheral hydroxyl groups; or
      (ii) a hydroxyl functional dendritic polymer having a theoretical peripheral functionality of 16 or at least 32 to 64 wherein at least 5% of its peripheral hydroxyl groups have been functionalized by a hydrophilic group selected from the group consisting of: primary amino groups, secondary amino groups, tertiary amino groups, quaternary ammonium salt groups, carboxyl groups, sulfonic acid groups, and phosphoric acid groups; and either one of steps:
   (b1) mixing said (i) hydroxyl terminated dendritic polymer with a non-dendritic polymer in the presence of a cross-linker, followed by reaction with a hydrophilic functionalizing agent, wherein said hydrophilic functionalizing agent is selected to functionalize at least 5% of said peripheral hydroxyl groups of said dendritic polymer with said hydrophilic groups; or
   (b2) mixing said (ii) hydrophilic functionalized dendritic polymer with a non-dendritic polymer, to thereby form a dendrimer-non-dendrimer (DND) polymer hybrid, wherein said nondendritic polymer in (b1) or (b2) is present in an amount of from 20% to 95% by weight based on total weight of said DND polymer hybrid;
   (c) dispersing said DND polymer hybrid in an aqueous medium, and wherein said non-dendritic polymer is selected from the group consisting of: polyester, polyacrylate, polyurethane, polyester polyol, polyurethane, PUD, polyol, polyacrylate polyol, polycarbonate, polycarbonate polyol, copolymers and blends thereof.

9. The process of claim 8, further comprising a step (d): mixing said DND polymer hybrid with one or more cross-linkers to form said aqueous dispersible polymer composition.

10. The process of claim 8, wherein said mixing step (b2) comprises physical blending.

11. The process of claim 8, wherein said mixing step (b1) comprises chemically reacting said dendritic polymer with said non-dendritic polymer in the presence of a cross-linker.

12. The process of claim 8, further comprising a step (d): at least partially neutralizing said DND polymer hybrid polymer with a base.

13. A method of forming a protective coating over a surface, the method comprising applying the aqueous dispersible polymer composition according to claim 1 over the surface.

14. The method according to claim 13, further comprising a step of curing said protective coating by subjecting said protective coating to temperatures greater than 25° C.

15. The method according to claim 13, further comprising a step of curing said protective coating by exposing said coating to ultra-violet (UV) radiation.

16. An article coated by the aqueous dispersible polymer composition according to claim 1.

17. An aqueous dispersible coating composition comprising:
- a first component comprising an aqueous dispersible polymer composition according to claim 1; and
- a second component comprising a cross-linker, wherein the first and second components are mixed together to form the coating composition.

18. The aqueous dispersible polymer composition of claim 1, wherein said non-dendritic polymer is present in an amount of from 50% to 95% by weight based on total weight of said DND polymer hybrid.

19. The process of claim 8, wherein said non-dendritic polymer in (b1) or (b2) is present in an amount of from 50% to 95% by weight based on total weight of said DND polymer hybrid.

\* \* \* \* \*